US012694651B2

(12) United States Patent
Chen et al.

(10) Patent No.: US 12,694,651 B2
(45) Date of Patent: Jul. 28, 2026

(54) DATASET-AWARE AND INVARIANT LEARNING FOR FACE RECOGNITION

(71) Applicant: Wyze Labs, Inc., Kirkland, WA (US)

(72) Inventors: Lin Chen, Seattle, WA (US); Gaoang Wang, Haining (CN); Tianqiang Liu, Bellevue, WA (US)

(73) Assignee: Wyze Labs, Inc., Kirkland, WA (US)

( * ) Notice: Subject to any disclaimer, the term of this patent is extended or adjusted under 35 U.S.C. 154(b) by 709 days.

(21) Appl. No.: 18/004,850

(22) PCT Filed: Jul. 9, 2021

(86) PCT No.: PCT/US2021/041047
§ 371 (c)(1),
(2) Date: Jan. 9, 2023

(87) PCT Pub. No.: WO2022/011233
PCT Pub. Date: Jan. 13, 2022

(65) Prior Publication Data
US 2023/0267709 A1 Aug. 24, 2023

Related U.S. Application Data

(60) Provisional application No. 63/143,483, filed on Jan. 29, 2021, provisional application No. 63/049,987, filed on Jul. 9, 2020.

(51) Int. Cl.
*G06V 10/774* (2022.01)
*G06N 3/048* (2023.01)
(Continued)

(52) U.S. Cl.
CPC .......... *G06V 10/774* (2022.01); *G06N 3/048* (2023.01); *G06N 3/084* (2013.01); *G06V 10/776* (2022.01);
(Continued)

(58) Field of Classification Search
CPC .... G06V 10/774; G06V 10/776; G06V 10/82; G06V 40/168; G06V 40/172;
(Continued)

(56) References Cited

U.S. PATENT DOCUMENTS 11,669,739 B2 * 6/2023 Henderson ............... G06N 3/09
382/118
11,978,242 B2 * 5/2024 Yu ........................ G06V 40/171
(Continued)

FOREIGN PATENT DOCUMENTS

JP 2020135857 A 8/2020

OTHER PUBLICATIONS

ISA/US, International Search Report and Written Opinion mailed Nov. 22, 2021 for PCT/US21/41047 filed Jul. 9, 2021, Applicant: Wyze Labs, Inc., 10 pages.
(Continued)

*Primary Examiner* — Wesley J Tucker
(74) *Attorney, Agent, or Firm* — Perkins Coie LLP; Nicole Dunham; Andrew T. Pettit

(57) ABSTRACT

Introduced here is an approach to training a model to perform facial recognition with a designed dataset-aware loss. This approach is particularly useful for large-scale, multi-dataset training since there are no prerequisites for label cleaning. Dataset-aware loss may be built upon the softmax function with a binary dataset indicator. Such an approach allows the dataset-aware loss to be readily combined with other losses to improve performance.

15 Claims, 8 Drawing Sheets

CASIA

VGGFace2

(51) Int. Cl.

| | |
|---|---|
| *G06N 3/084* | (2023.01) |
| *G06V 10/776* | (2022.01) |
| *G06V 10/82* | (2022.01) |
| *G06V 40/16* | (2022.01) |

(52) U.S. Cl.
CPC ........... *G06V 10/82* (2022.01); *G06V 40/168* (2022.01); *G06V 40/172* (2022.01)

(58) Field of Classification Search
CPC .. G06V 30/19147; G06N 3/048; G06N 3/084; G06N 3/045; G06N 3/0464; G06N 3/09; G06N 3/047; G06N 3/082
See application file for complete search history.

(56) References Cited

U.S. PATENT DOCUMENTS

| | | | | |
|---|---|---|---|---|
| 12,148,245 | B2 * | 11/2024 | Xiong ................. | G06V 10/776 |
| 12,438,849 | B2 * | 10/2025 | Wang .................... | G06N 3/047 |

| | | | | |
|---|---|---|---|---|
| 2005/0147291 | A1 * | 7/2005 | Huang ................. | G06V 40/172 |
| | | | | 382/218 |
| 2019/0102528 | A1 * | 4/2019 | Beacham ............... | G06V 10/82 |
| 2019/0171908 | A1 | 6/2019 | Salavon | |
| 2020/0117886 | A1 * | 4/2020 | Kastaniotis .......... | G06V 10/454 |
| 2020/0279279 | A1 * | 9/2020 | Chaudhuri ............ | G06F 40/295 |
| 2022/0207260 | A1 * | 6/2022 | Dong ..................... | G06V 10/82 |
| 2025/0182510 | A1 * | 6/2025 | Malik ............... | G06V 10/7715 |

OTHER PUBLICATIONS

Hu, E. et al. "Heterogeneous Face Recognition Based on Multiple Deep Networks With Scatter Loss and Diversity Combination," IEEE Access, vol. 7, Jun. 2019; pp. 75305-75317.

Yao, Y. et al. "Cross-dataset Training for Class Increasing Object Detection" arxiv.org, Cornell University Library, Jan. 2020, arXiv:2001.04621, 10 pages.

* cited by examiner

TABLE I

VERIFICATION ACCURACY (IN %) OF USING DIFFERENT LOSSES.

| Loss | Dataset | LFW | CFP-FP | AgeDB-30 |
|---|---|---|---|---|
| SphereFace4 | CASIA | 99.1 | 94.4 | 91.7 |
| CosFace | CASIA | 99.5 | 95.4 | 94.6 |
| CM (0.9, 0.4, 0.15) | CASIA | 99.5 | 95.2 | 94.9 |
| ArcFace | CASIA | 99.5 | 95.6 | 95.2 |
| ArcFace | MS1M | 99.8 | 92.7 | 97.8 |
| Proposed | Comb | 99.8 | 98.7 | 98.2 | a All models are using ResNet50 for embedding.

TABLE II

VERIFICATION ACCURACY (IN %) ON LFW COMPARED WITH
STATE-OF-THE-ART METHODS.

| Method | #Image | LFW |
|---|---|---|
| DeepID [21] | 0.2M | 99.5 |
| Deep Face [58] | 4.4M | 97.4 |
| VGG Face [13] | 2.6M | 99.0 |
| FaceNet [10] | 200M | 99.6 |
| Baidu [59] | 1.3M | 99.1 |
| Center Loss [6] | 0.7M | 99.3 |
| Range Loss [11] | 5M | 99.5 |
| Marginal Loss [12] | 3.8M | 99.5 |
| Proposed (ResNet50) | 19.6M | 99.8 |

TABLE III

ABLATION STUDY USING MOBILENETV1. THE NUMBERS ARE
ACCURACIES (IN %).

| Method | Dataset | LFW | CFP-FP | AgeDB-30 |
|---|---|---|---|---|
| ArcFace | MS1M | 99.5 | 88.9 | 95.9 |
| ArcFace | VGGFace2 | 99.5 | 94.2 | 93.6 |
| Naïve Comb | Comb | 99.1 | 95.0 | 94.8 |
| DA | Comb | 99.5 | 95.4 | 95.7 |
| DA+GRL | Comb | 99.7 | 96.0 | 96.0 |
| DA+GRL+CD | Comb | 99.6 | 96.3 | 96.2 |

Figure 7:
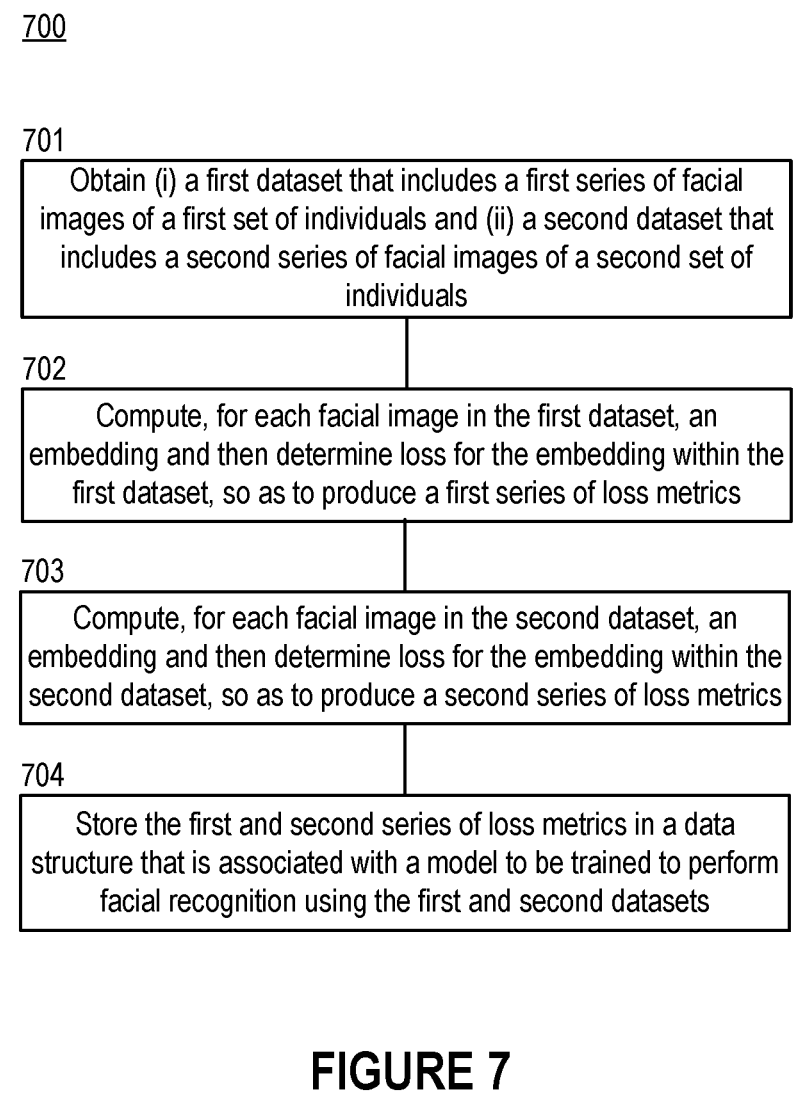

701
Obtain (i) a first dataset that includes a first series of facial images of a first set of individuals and (ii) a second dataset that includes a second series of facial images of a second set of individuals 702
Compute, for each facial image in the first dataset, an embedding and then determine loss for the embedding within the first dataset, so as to produce a first series of loss metrics 703
Compute, for each facial image in the second dataset, an embedding and then determine loss for the embedding within the second dataset, so as to produce a second series of loss metrics 704
Store the first and second series of loss metrics in a data structure that is associated with a model to be trained to perform facial recognition using the first and second datasets

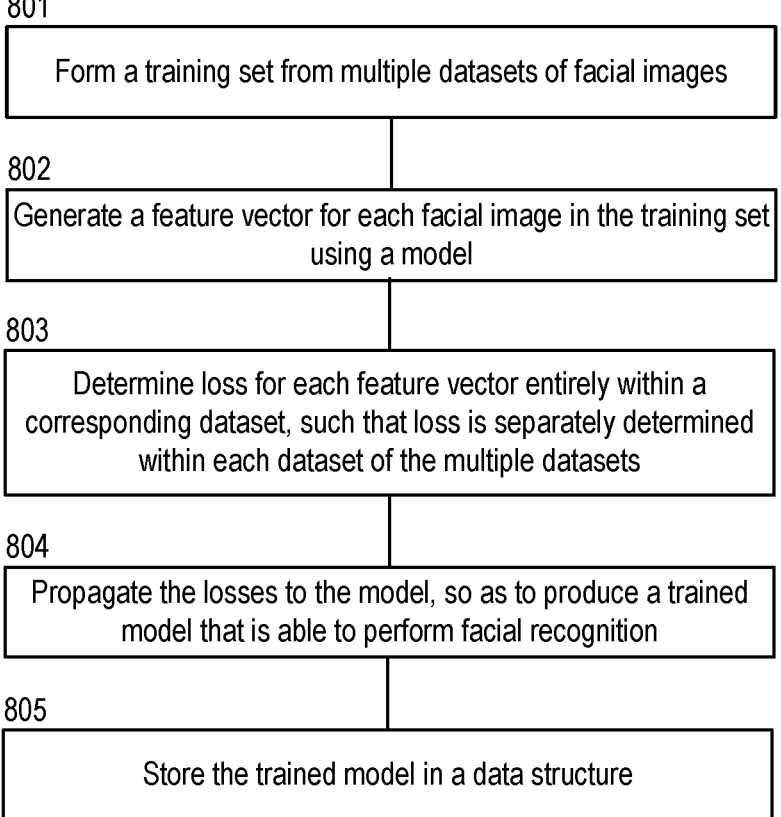

801

Form a training set from multiple datasets of facial images

802

Generate a feature vector for each facial image in the training set using a model

803

Determine loss for each feature vector entirely within a corresponding dataset, such that loss is separately determined within each dataset of the multiple datasets

804

Propagate the losses to the model, so as to produce a trained model that is able to perform facial recognition

805

Store the trained model in a data structure

DATASET-AWARE AND INVARIANT LEARNING FOR FACE RECOGNITION

CROSS-REFERENCE TO RELATED APPLICATIONS

This application claims priority to U.S. Provisional Application No. 63/049,987, titled "Dataset-Aware and Invariant Learning for Face Recognition" and filed on Jul. 9, 2020, and U.S. Provisional Application No. 63/143,483, titled "Dataset-Aware and Invariant Learning for Face Recognition" and filed on Jan. 29, 2021, each of which is incorporated herein by reference in its entirety.

TECHNICAL FIELD

Various embodiments concern approaches to developing and training software-implemented models to perform face recognition.

BACKGROUND

The terms "face recognition system" and "facial recognition system" may be used to refer to any technology that is capable of matching a face from a digital image (or simply "image") against a database of faces, so as to determine the identity of an unknown person. Facial recognition systems are normally designed to authenticate an unknown person by detecting and then measuring facial features through image analysis.

Historically, facial recognition systems have taken the form of computer programs (also referred to as "software programs"). However, facial recognition systems have more recently seen wider uses on various computing devices in various contexts. Examples of such computing devices include augmented reality (AR) systems and surveillance systems (also referred to as "security systems"). For instance, a surveillance system that is deployed in a home environment may include several digital cameras that generate images of different areas of the home environment. When applied to these images, a facial recognition system may be able to determine the identity of individuals captured in these digital images.

While the accuracy of facial recognition systems has traditionally been lower than other biometric technologies, such as iris recognition and fingerprint recognition, it has become widely adopted due to its contactless nature. Facial recognition systems do suffer from a notable downside, however. To achieve good performance in facial recognition, large datasets are usually required to train the underlying algorithms that are employed by a facial recognition system. Without a large dataset, the underlying algorithms may simply struggle to identify an unknown person due to an insufficient number of samples (also referred to as "examples") provided for training. However, large datasets are not only difficult to obtain but can also pose issues during training.

BRIEF DESCRIPTION OF THE DRAWINGS

FIG. 5 includes several tables that illustrate how the approach described herein compares to conventional methods.

FIG. 7 includes a flow diagram of a process for training a model to perform facial recognition in a dataset-aware manner.

FIG. 8 includes a flow diagram of another process for training a model to perform facial recognition with multiple datasets of facial images.

Figure 1:
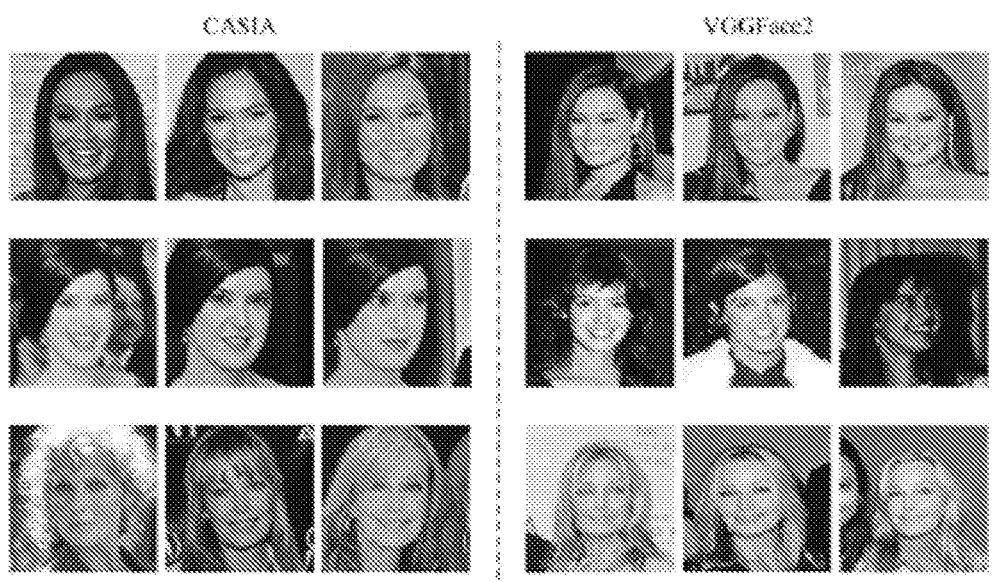
FIG. 1 illustrates how two datasets—CASIA and VGG-Face2—overlap, with each row representing images of the same person while the left and right parts represent the images that are selected from CASIA and VGGFace2, respectively.

Various features of the technology described herein will become more apparent to those skilled in the art from a study of the Detailed Description in conjunction with the drawings. Embodiments are illustrated by way of example and not limitation in the drawings. Although the drawings depict various embodiments for the purpose of illustration, those skilled in the art will recognize that alternative embodiments may be employed without departing from the principles of the technology. Accordingly, while specific embodiments are shown in the drawings, the technology is amenable to various modifications.

DETAILED DESCRIPTION

To detect and then identify an unknown person based on an image of her face, a facial recognition system may apply a series of algorithms to the image. This series of algorithms is generally referred to as a "model" or "network." Various models have been developed in an effort to achieve better performance in facial recognition.

Conventional models have explored different loss functions to improve performance. Most of these loss functions aim to learn facial feature embeddings that maximize the inter-class distance and minimize the intra-class distance. Traditionally, two types of losses were commonly used. The first type of loss is softmax-based classification loss, variations of which are employed by SphereFace, CosFace, and ArcFace. The second type of loss is contrastive loss, variations of which include triplet loss, center loss, range loss, and margin loss.

The architecture of conventional models is another factor that influences performance in facial recognition. A key aspect of facial recognition is extracting—from images—the facial features (or simply "features") that can be used for recognition. Thus, conventional models will apply a feature extraction algorithm (also referred to as a "feature extractor") to images provided as input when performing facial recognition. VGG and ResNet are examples of feature extractors that are commonly used in conventional models. Some modifications—like squeeze-and-excitation networks (SENets) and grouped convolutions—can also be applied to existing feature extractors that serve as a "backbone."

For the same type of architecture, heavyweight models tend to perform better than lightweight models. The terms "heavyweight" and "lightweight" refer to the amount of computational resources needed by a corresponding model (and thus may dictate where the corresponding model resides). Some lightweight models enable facial recognition to be performed on computing devices with limited computational resources, such as mobile phones, tablet computers, and wearable electronic devices. These lightweight models may have carefully designed architectures that experience only a marginal decrease in accuracy but offer significant savings in computational cost.

Training data is also very critical for learning a model that is able to output accurate predictions. A few years ago, DeepID was designed to learn feature representations from training data that included several hundred thousand images. Larger datasets have since been created, however, such as VGGFace2, MS1M, MegaFace, CASIA, and FaceNet. FaceNet, for example, has over 200 million images in its training data. With the help of these larger datasets, significant progress has been made in improving the accuracy of models designed for facial recognition in recent years.

Greater amounts of training data tend to lead to better outcomes, namely, more accurate predictions by models trained to recognize faces. To further improve accuracy then, one might propose combining at least two datasets to form a superset that can be used for training. While the concept may be superficially attractive, there are significant challenges in fusing together different datasets—a process referred to as "dataset fusion."

Figure 2:
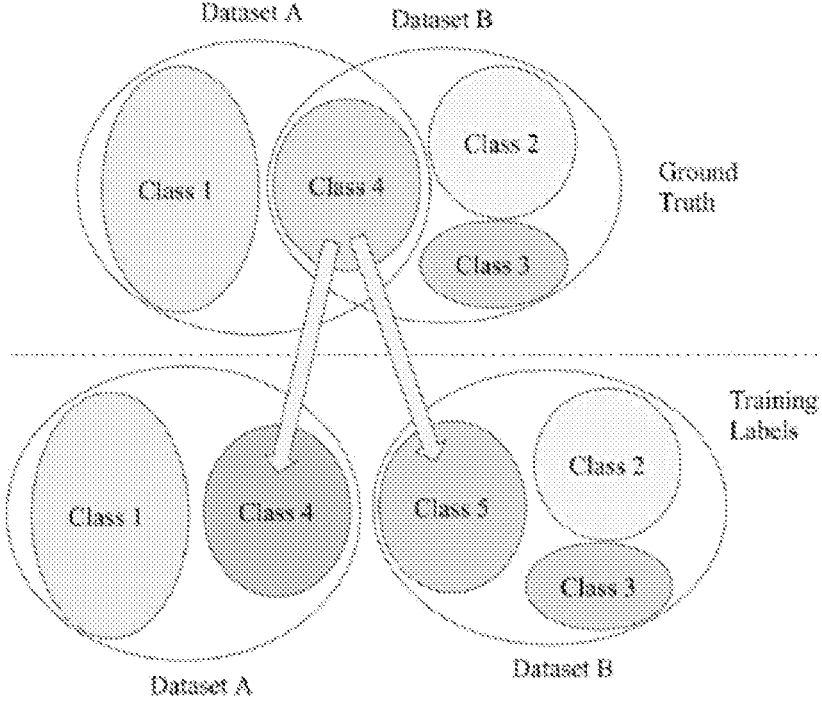
FIG. 2 illustrates how the issue of overlapping identity across multiple datasets of images can become problematic.

The main challenge of dataset fusion relates to "cleaning" the labels to ensure consistency. Datasets may overlap if images of the same individuals are included in those datasets. In fact, overlap is a relatively common occurrence since many datasets include images (e.g., of celebrities) that are publicly available. As an example, FIG. 1 illustrates how two datasets—CASIA and VGGFace2—overlap, with each row representing images of the same person while the left and right parts represent the images that are selected from CASIA and VGGFace2, respectively, If distinct class identifiers (also referred to as "facial identifiers") are naively set for images from different data sets during training, the incorrect labels will harm the classification for multi-dataset training. FIG. 2 illustrates how the issue of overlapping identity across multiple datasets of images can become problematic. In FIG. 2, Class 4 exists in Dataset A and Dataset B. When Datasets A and B are combined during training, if distinct labels are naively set to differentiate across the different datasets, images from Class 4 will be assigned two different labels. This results in identity overlap, which will negatively affect facial recognition performance.

A process referred to as "label cleaning" may be performed in an attempt to address this issue. Label cleaning requires that the labels and images across different datasets be carefully checked by individuals. These individuals may be referred to as "labelers" or "graders." Those skilled in the art will appreciate that significant manual effort (and computational resources) are needed to ensure this is done correctly. Whenever a new dataset is added, significant manual effort is necessary to check whether certain images and individuals are already included in the existing dataset in order to avoid the identity overlap issue described above.

Introduced here, therefore, is an approach with a designed dataset-aware loss that is intended for large-scale, multi-dataset training without prerequisites for label cleaning. As further discussed below, this dataset-aware loss may be built upon the softmax function (or simply "softmax") with a binary dataset indicator. The terms "softmax loss function" and "softmax loss," as used herein, may be referred to the combination of softmax plus a cross-entropy loss. Softmax is an activation function that—when applied to an image— outputs a probability for each possible class, and these probabilities sum to one. Cross-entropy loss, meanwhile, is the sum of the negative logarithm of these probabilities.

When a training sample is obtained, the softmax loss can be computed for the dataset to which the training sample belongs, with no influence from other datasets. Said another way, the softmax loss can be computed within each dataset separately. As a result, the identity overlap issue can be largely, if not entirely, alleviated. To further ensure that face embeddings (or simply "embeddings") are not dataset dependent, dataset-invariant learning (e.g., with gradient reversal layers) can also be adopted for multi-dataset domain adaptation.

There are several core aspects of the approach described herein that differentiate it from conventional approaches to training models to perform facial recognition:

First, the approach can implement a process for multi-dataset training in facial recognition where the same identity may appear in multiple datasets;

Second, the approach can implement a process for designing dataset-aware loss to solve the identity overlap issue without requiring any effort be expended toward label cleaning; and Third, the approach can implement a process for adapting a domain with gradient reversal layers (GRLs) to ensure the robustness of multi-dataset training and learning of dataset-invariant embeddings.

For the purpose of illustration, these aspects may be described in the context of training a model to perform facial recognition for the purpose of determining the identities of individuals captured in images generated by a surveillance system. However, those skilled in the art will recognize that these aspects may be similarly applicable to performing facial recognition in other contexts. For example, a model that is trained to perform facial recognition could be used in the context of biometric authentication.

Moreover, embodiments may be described in the context of computer-executable instructions for the purpose of illustration. Aspects of the technology could be implemented via hardware, firmware, or software, however. Assume, for example, that a surveillance system includes digital cameras that are deployed throughout a given environment. A model that is trained to perform facial recognition can be applied to images that are generated by those digital cameras. In some embodiments those digital cameras include the necessary components (and computational resources) for applying the model, while in other embodiments the images are transmitted to another computing device, such as a mobile phone or network-accessible server system, for analysis. As further discussed below, this other computing device may train the model to perform facial recognition, or this other computing device may obtain the model from elsewhere.

Terminology

References in this description to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense. Thus, unless otherwise noted, the term "based on" is intended to mean "based at least in part on."

The terms "connected," "coupled," and variants thereof are intended to include any connection or coupling between objects, either direct or indirect. The connection or coupling can be physical, logical, or a combination thereof. For example, objects may be electrically or communicatively coupled to one another despite not sharing a physical connection.

The term "module" may be used to refer broadly to software, firmware, or hardware. Modules are typically functional components that generate one or more outputs based on one or more inputs. A computer program may include one or more modules. Thus, a computer program may include multiple modules that are responsible for completing different tasks or a single module that is responsible for completing all tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open ended.

Related Work in Machine Learning

To better understand the approach described here, additional information is provided on three topics, namely, loss functions, data processing, and domain adaptation. Each of these topics is discussed in greater detail below.

A. Loss Functions

Classification losses, including softmax loss and its variations, are widely used in facial recognition. In recent years, these classification-based losses have shown great power in facial recognition. For example, SphereFace introduces an angular margin to softmax, CosFace proposes a large margin cosine loss where an extra margin is applied in cosine space rather than angle space, and ArcFace employs an additive angular margin to softmax. With these margin modifications, the embeddings are more discriminative across different identities.

Other variations have also been explored in addition to angular softmax. For example, noisy softmax has been proposed to mitigate early saturation by injecting annealed noise into softmax, and Gaussian mixture loss has been proposed under the assumption that the deep features may follow a Gaussian mixture distribution.

Contrastive loss is commonly used in the distance metric learning field, and it is also fairly well explored in the context of facial recognition. This type of loss aims at learning embeddings that maximize inter-class distance while minimizing intra-class distance within each batch of training samples. As an example, FaceNet first introduced triplet loss that encourages distance learning from an anchor sample to positive and negative samples in a triplet manner. Center loss was then proposed to penalize the discrepancy between deep features and the corresponding class centers. Range loss was designed to reduce overall intra-personal variations while enlarging inter-personal differences simultaneously, and marginal loss was designed to simultaneously minimize intra-class variances and maximize inter-class variances by focusing on marginal samples.

Since the focus of classification loss and contrastive loss has a small difference, combining these two types of losses is a popular approach to training. However, despite the benefit in generating discriminative features, none of these proposed losses can address instances of mislabeling in the context of multi-dataset training.

B. Data Processing

Data processing (also referred to as "data handling") is an important step in making noisy data suitable for training. In the context of facial recognition, there are two processes worth briefly summarizing, namely, label cleaning and noise-resistant learning.

Noisy labels is a common issue in facial recognition. Several approaches have been proposed for label cleaning, a process by which a clean dataset is generated from noisy annotated labels. For instance, one approach proposes implementing a community detection algorithm and deep convolutional neural network (CNN) models to delete mislabeled images, while another approach proposes treating the removal of wrongly labeled images as a quadratic programming problem. These automatic or semi-automatic approaches to addressing mislabeled images have very high computational costs, however, and thus are not suitable for many situations (e.g., where computational resources are limited). Efficiently addressing overlapping labels from different datasets is simply a topic that is rarely considered since these conventional approaches, while computationally expensive, are suitable—at least in theory.

Rather than clean the labels of a dataset, a model could instead implement a noise-resistance approach in an attempt to alleviate the effect of noisy labels in the training data. As an example, a lightweight CNN has been proposed for facial representation with noisy labels. Entities have also proposed filtering out training data with incorrect labels during training. These noise-resistant approaches do not require any cleaning in advance of training, and thus can offer significant savings in computational cost. However, errors can be easily propagated in training with pseudo-corrected labels, and the overlapping identity issue still cannot be addressed when multiple datasets are used for training.

C. Domain Adaptation

Domain adaptation plays an important role in facial recognition in terms of dealing with the domain drift that occurs between training datasets and testing datasets. Transfer learning is one of the most straightforward approaches to domain adaptation. For example, transfer learning with triplet loss has been employed to bridge the gap between different domains. However, approaches based on transfer learning cannot be easily applied to unlabeled target domain images.

Domain-specific architectures have been shown to be effective in facial recognition. As an example, a domain-specific unit architecture has been proposed for each domain, aiming at extracting different low-level features from different domains. However, such an approach requires several subnetworks for each domain, and therefore is not efficient nor practical in real-world scenarios.

Another common approach to domain adaptation involves directly transferring facial images from the source domain to the target domain. For example, an image generator module (or simply "image generator") may be applied to transform an image from the source domain to the target domain. Another proposed approach involves using a linear combination of sparse target domain neighbors in the image space to represent source images. A generative approach with the assistance of a three-dimensional (3D) face model has also been investigated for facial recognition. Generative approaches show great promise in domain adaptation but usually require very large datasets for training.

Domain adaptation can also be conducted in the latent feature space. For example, disentangled variational representation has been proposed for cross-model matching. Another proposal involved applying a simple support vector machine (SVM) model to transform the latent feature space for the adaptation. Compared with the direct methods that generate target images directly, latent space adaptation methods are more efficient and robust. However, combining multiple datasets for training purposes has not been explored due to the above-mentioned difficulties.

Overview of Dataset-Aware Approach to Training

To achieve better performance, combining different datasets in training is a straightforward strategy. However, overlapping identities across the different datasets is a common (and significant) problem in the context of facial recognition. In training, the same facial identifiers from different datasets are treated as different labels. These mislabeled samples affect the recognition performance of the model being trained. Conventional approaches to addressing the overlapping identity issue are insufficient for various reasons, and thus a new approach is needed.

Introduced here is a dataset-aware loss that can be utilized in multi-dataset training without requiring that any effort be expended on label cleaning. As further discussed below, this dataset-aware approach to training can be implemented by a computing device. The dataset-aware loss can be easily combined with other softmax-based losses, such as SphereFace, CosFace, and ArcFace. A domain adaptation approach with GRLs is also introduced that can be employed to ensure that the embeddings learned by the model are dataset invariant.

Figure 3:
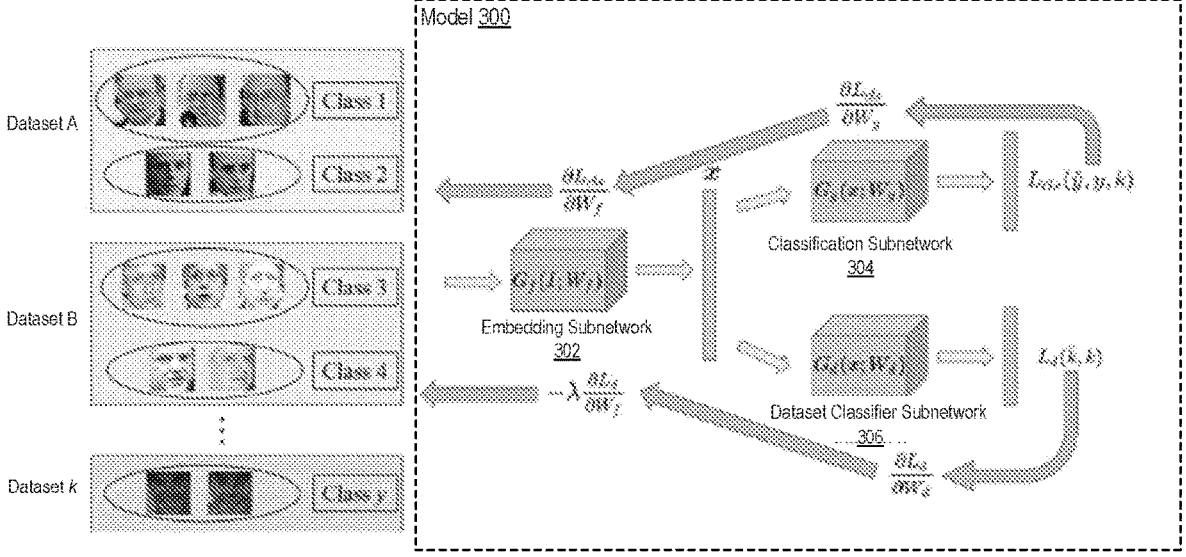
FIG. 3 includes an illustration of the framework of the approach described herein.

FIG. 3 includes an illustration of the framework of the approach described herein. Along the left side of FIG. 3, there are multiple datasets, each displayed in a different color, that are combined in training. Each ellipse represents a different facial identity (and thus corresponds to a different facial identifier). The model 300 includes three subnetworks: an embedding network (G_f) 302, a classification network (G_y) 304, and a dataset classifier network (G_d) 306. Note that these networks may be referred to as "subnetworks" in embodiments where the model 300 itself is representative of a network. Together, these networks are representative of a system that can be used to train a model to perform facial recognition using multiple datasets. Each of these networks is discussed in greater detail below. In FIG. 3, yellow arrows represent the forward flow of training, while the red arrows represent the backward flow of training. Said another way, the red arrows represent the backpropagating for the gradient update of the model 300. Backpropagation can be performed by a backpropagation algorithm that is able to work in concert with the embedding network 302, classification network 304, and dataset classifier network 306. Note that the dataset-aware loss is supervised by class label (y) and dataset index (k).

A. Dataset-Aware Loss

For the purpose of illustration, the training set that contains K different datasets $\mathcal{D}_1, \mathcal{D}_2, \ldots, \mathcal{D}_K$ will be denoted as $\mathcal{D}=\{\mathcal{D}_1, \mathcal{D}_2, \ldots, \mathcal{D}_K\}$. Each training sample can be represented as $(x_i, y_i, k_{y_i})$, where $x_i$ is the embedding vector (or simply "embedding") of the i-th training sample, $y_i$ is the identity label of the i-th training sample, and $k_{y_i}$ presents a mapping from the identity label $y_i$ to the dataset index k. As mentioned above, the terms "training sample" and "training example" may be used interchangeably.

The overlapping identity issue is described as two training samples $(x_i,x_j)$ that have the same identity label $(y_i=y_j)$ but are from different datasets $(k_{y_i}\neq k_{y_j})$. Since the identity labels from different datasets should be different, a simplistic approach would be to set $y_i$ not equal to $y_j$ (i.e., $y_i\neq y_j$). However, such ambiguity in mislabeling can do harm in training.

One of the most widely used loss functions in classification problems is softmax loss, which can be defined as follows:

$$L = -\frac{1}{N}\sum_{i=1}^{N} \log \frac{e^{W_{y_i}^T x_i+b_{y_i}}}{\sum_{j=1}^{C} e^{W_j^T x_i+b_j}}, \qquad \text{Eq. 1}$$

where {W, b} are the softmax layer parameters and C is the number of classes. Note that the softmax layer parameters may also be referred to as "weights." To overcome the mislabeling issue, the dataset indicator can be defined to indicate whether training samples are from the same dataset. For example, the dataset indicator may be defined as follows:

$$1_{k_i=k_j} = \begin{cases} 1, & \text{if } k_i = k_j, \\ 0, & \text{otherwise} \end{cases}. \qquad \text{Eq. 2}$$

With this definition, the dataset-aware loss can be defined as:

$$L = -\frac{1}{N}\sum_{i=1}^{N} \log \frac{e^{W_{y_i}^T x_i+b_{y_i}}}{e^{W_{y_i}^T x_i+b_{y_i}} + \sum_{j=1,j\neq y_i}^{C} 1_{k_j=k_{y_i}} e^{W_j^T x_i+b_j}}. \qquad \text{Eq. 3}$$

Figure 4:
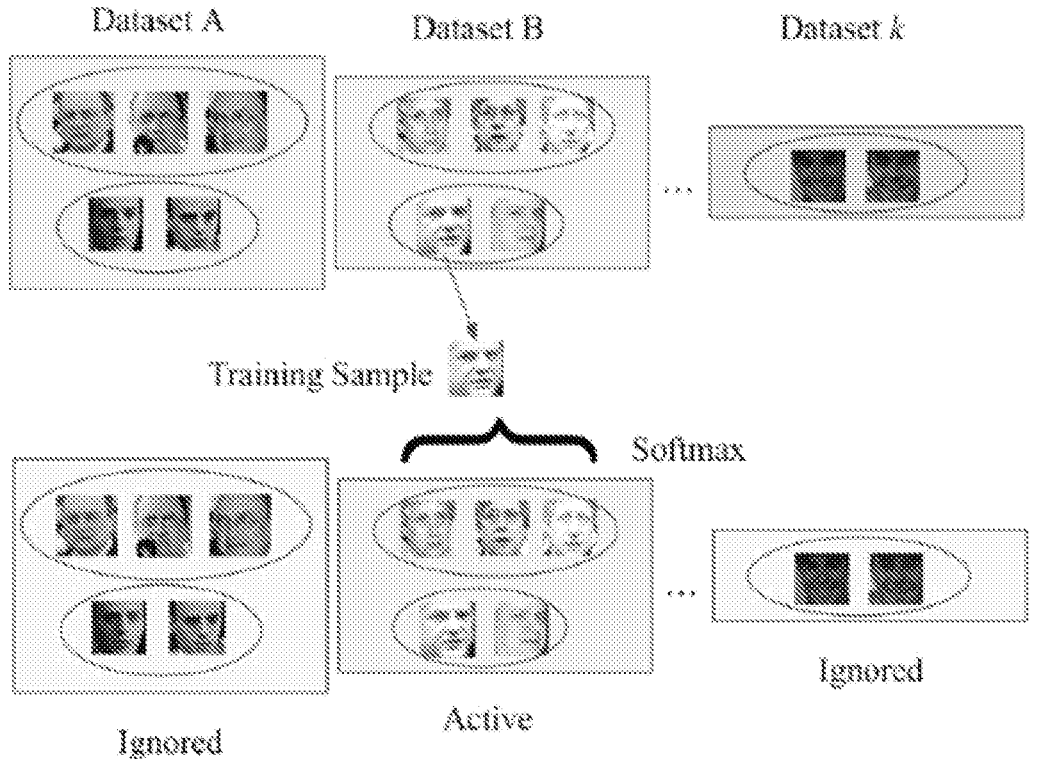
FIG. 4 illustrates how the proposed dataset-aware loss can address mislabeling.

In other words, the softmax loss can be computed within each dataset separately. As a result, the mislabeling issue can be solved. FIG. 4 illustrates how the proposed dataset-aware loss can address mislabeling. The softmax loss may be computed only within the dataset of whichever training sample is under review (also referred to as the "active training sample"). In this example, Dataset B is active since the training sample is selected from Dataset B, while the other datasets are ignored when computing the softmax loss.

Another advantage of the dataset-aware loss is that it can be combined with variations of softmax-based losses. As an example, consider ArcFace. The dataset-aware loss—when combined with ArcFace—can be presented as follows:

$$L = -\frac{1}{N}\sum_{i=1}^{N} \log \frac{e^{s\cos(\theta_{y_i}+m)}}{e^{s\cos(\theta_{y_i}+m)} + \sum_{j=1,j\neq y_i}^{C} 1_{k_j=k_{y_i}} e^{s\cos\theta_j}}, \qquad \text{Eq. 4}$$

where θ, m, and s represent the angle, margin penalty, and scale, respectively. This example shows the compatibility of the dataset-aware loss with the most advanced loss functions.

B. Dataset-Invariant Learning by Domain Adaptation

To further improve the robustness of facial recognition performance across multiple domains, dataset-invariant learning is important to ensure that the latent embeddings are not dataset dependent. Domain adaptation with GRLs can be adopted for learning the embeddings. Further information on an embodiment of the domain adaptation model with GRLs is provided below.

Models that are trained to perform facial recognition normally have two subnetworks: a feature embedding subnetwork $x_i=G_f(I_i; W_f)$ and a classification subnetwork $\hat{y}=G_y(x_i;W_y)$, where $I_i$ is the facial image provided as input, $x_i$ is the embedded feature vector, and $W_f$ and $W_y$ are the network parameters. At a high level, the feature embedding subnetwork (or simply "embedding subnetwork") is responsible for extracting facial features from the facial image and then predicting a vector representation (e.g., of 64, 128, or 256 elements) of those facial features. This vector representation may be referred to as a "face embedding" or "embedding." Meanwhile the classification subnetwork is responsible for classifying the embedding, thereby predicting the identity of the individual whose face is captured in the facial image.

A dataset classifier subnetwork $\hat{k}_i=G_d(x_i;W_d)$ can be added after the embedding subnetwork to classify which dataset the facial image provided as input belongs to. Two loss functions can then be considered as follows:

$$L_{cls} = \sum_i J_{cls}(G_y(G_f(I_i; W_f); W_y), y_i, k_i) \qquad \text{Eq. 5}$$

$$= \sum_i J_{cls}(G_y(x_i; W_y), y_i, k_i)$$

$$L_d = \sum_i J_d(G_d(G_f(I_i; W_f); W_d), k_i) \qquad \text{Eq. 6}$$

$$= \sum_i J_d(G_d(x_i; W_d), k_i)$$

$J_{cls}(\bullet)$ is the classification loss—which may be the dataset-aware loss—and $J_d(\bullet)$ is the classification loss for the dataset classifier subnetwork. To learn the network parameters $(W_f, W_y)$, a computing device can attempt to minimize the dataset-aware loss as much as possible.

A good embedding should also be dataset invariant. Said another way, an embedding should be able to fool the dataset classifier subnetwork so that the embedding does not correlate with the dataset. To ensure this happens, the network parameters may be optimized as follows:

$$(\hat{W}_f,\hat{W}_y)=\text{argmin}_{W_f,W_y}\{L_{cls}(W_f,W_y,y,k)-\lambda L_d(W_f,\hat{W}_d,k)\}, \qquad \text{Eq. 7}$$

$$\hat{W}_d=\text{argmin}_{W_d}L_d(\hat{W}_f,W_d,k), \qquad \text{Eq. 8}$$

where $\lambda$ controls the tradeoff between the two objectives that shape the embeddings during learning.

C. Optimization

At the beginning of the training, the dataset classifier subnetwork $G_d(\cdot, W_d)$ will not be well established. As a result, the gradient update for the embedding $W_f$ from the dataset classifier loss $L_d(W_f, \hat{W}_d, k)$ will not be stable, and therefore will negatively affect the discriminative ability in the classification. To further stabilize training, the computing device may split optimization into two stages. The first stage is to initialize the network parameters and then train the classification subnetwork and dataset classifier subnetwork separately as follows:

$$(\hat{W}_f,\hat{W}_y)=\text{argmin}_{W_f,W_y}L_{cls}(W_f,W_y,y,k), \qquad \text{Eq. 9}$$

$$\hat{W}_d=\text{argmin}_{W_d}L_d(\hat{W}_f,W_d,k). \qquad \text{Eq. 10}$$

Note that in Eq. 9, the embedding subnetwork $W_f$ is only supervised by the classification loss $L_{cls}(W_f, W_y, y, k)$ without the dataset classifier loss $L_d(W_f, \hat{W}_d, k)$. After each subnetwork converges, the computing device can further finetune some or all of the parameters based on Eqs. 7 and 8 in the second stage of training.

Experiments and Results

A. Datasets and Experimental Settings

To test the dataset-aware loss, an experiment was performed in which ten datasets were combined during training of a model to perform facial recognition. These datasets included 14-Celebrity, Asian-Celeb, CASIA, CelebA, Deep-Glint, MS1M, PinsFace, 200-Celeb, VGGFace2, UMDFace. Meanwhile the validation datasets included LFW, CFP-FP, and AgeDB-30. A description of each of these datasets is provided below:

14-Celebrity is a small-scale dataset that includes 14 identities and 117 images;

Asian-Celeb is a dataset that contains around 94,000 Asian celebrities and 2.8 million images;

CASIA is created and annotated from facial images available on the Internet, and it includes more than 10,000 identities and 500,000 images;

CelebA is a large-scale dataset that includes 10,000 identities, each of which is associated with 20 images;

DeepGlint is a large-scale dataset that is representative of a modified combination of Asian-Celeb and MS1M, and it includes 180,000 identities and 6.8 million images;

MS1M is a modified version of the Microsoft Celeb dataset that includes roughly 1 million celebrities and 6 million images;

PinsFace, which is collected from Pinterest, includes 105 celebrities and 17,534 images;

200-Celeb includes self-collected images of some Asian celebrities, including 268 identities and 25,000 images;

VGGFace2, which contains images from Google Image Search with large variations in pose, age, lighting, and background, includes 8,600 identifies and 3.1 million images;

UMDFace contains images that are downloaded from the Internet with face detection and human annotation, and it includes 8,300 identities and 400,000 images;

LFW is the most widely used dataset for facial recognition validation, and it includes 5,700 identities and 13,000 images;

CFP-FP focuses on frontal-to-profile facial verification, and it includes 500 identities and 7,000 images; and AgeDB-30 contains 16,000 images of 568 different identities.

Two backbones, ResNet50 and MobileNetV1, were used as the embedding subnetworks, followed by two separate fully connected layers used for the classification subnetwork and dataset classifier subnetwork. Those skilled in the art will recognize that these are simply examples of possible models, and thus are not intended to limit the present disclosure. The embedding dimensions for ResNet50 and MobileNet1 were set to be 512 and 128, respectively. The parameter (A) from Eq. 7 was set to 0.1. In training, batch sizes of 256 and 512 were used for ResNet50 and Mobile-NetV1, respectively. The pre-trained model was adopted from Eq. 1, while the initial learning rate was set as 0.005. The learning rate was decayed by 10 times at steps 80,000, 140,000, and 200,000. The maximum steps for training was set at 240,000 for MobileNetV1, and the maximum steps for training was set at 480,000 for ResNet50. When incorporating domain adaptation into the training, two training stages were set as explained above. The shift from the first stage to the second stage occurred at step 80,000.

B. Comparison to Convention Methods

The method described herein is able to combine the ArcFace loss with dataset-aware loss, for example, as a default setting. This approach leads to much better accuracy. Table I of FIG. 5 illustrates how a proposed combination of ArcFace loss and dataset-aware loss compared to softmax-based losses in terms of facial verification accuracy. The term "comb" in the table means combining the above-mentioned datasets in training.

From the table, it is clear that the results are largely dependent on the training data. There is a roughly 0.3 percent increase in accuracy if CASIA is changed to MS1M using the ArcFace Loss. That outcome is reasonable since MS1M has nearly 8 times more identities and 10 times more images than CASIA. If multiple datasets are combined in training, the accuracy on CFP-FP increases by 3.1 and 6.0 percent compared with the individual CASIA and MS1M datasets, respectively. Similarly, the accuracy also increases on AgeDB-30 when combining multiple datasets in training. These results provide evidence that there should be a notable performance gain for multi-dataset training. Such an observation can be very beneficial for practice purposes.

Apart from the comparison with ArcFace, CosFace, and SphereFace, results comparing the method described herein to several state-of-the-art methods—along with the number of images used for training—are summarized in Table II of FIG. 5. The state-of-the-art methods include DeepID, Deep Face, VGG Face, FaceNet, Baidu, Center Loss, Range Loss, and Marginal Loss. DeepID extracts visual features hierarchically from local low-level to global high-level, and it is supervised by both identification and verification loss. Deep Face derives the facial representation by employing an explicit 3D face modeling approach. For VGG Face, the effect of using a large-scale dataset is explored in training, while FaceNet proposes a triplet loss for training on more than 200 million images. Baidu aggregates multi-patch information to learn the discriminative features. For Center Loss, Range Loss, and Marginal Loss, loss design to generate discriminative embeddings is explored.

For these various methods, it can be seen that having a large-scale dataset is an important factor in achieving good performance. The method described herein—when implemented using ResNet50 architecture—outperforms these various methods with the help of the multi-dataset training strategy. Note that while FaceNet adopts 200 million images in training, this dataset is not accessible to the public (and thus cannot be used to train other models).

C. Ablation Study

To validate the effectiveness of the method described herein, ablation studies were conducted for the dataset-aware loss and dataset-invariant learning. The results are summarized in Table III of FIG. 5. In this experiment, MobileNetV1 was adopted as the embedding subnetwork and evaluated on the LFW, CFP-FP, and AgeDB-30 datasets for the verification task. To compare the effect of different training data, two large-scale datasets—MS1M and VGG-Face2—were used for comparison. ArcFace loss without dataset-aware loss and domain adaptation was adopted since only a single dataset was used during training. The verification accuracy is shown in the first few rows of Table III. As can be seen in Table III, the performance on LFW is similar with only a few percentage points difference for CFP-FP and AgeDB-30. This indicates that the training data does indeed have a notable impact on performance.

Then, the baseline method that naively combines the ten datasets mentioned above was evaluated to learn the embedding by the default ArcFace loss. The result is shown in the third row of Table III with the baseline method named "Naïve Comb." As expected, there is no significant improvement compared to single dataset training, and there is even a drop in accuracy for the LFW dataset. This is due to the overlapping identity issue for multi-dataset training that is discussed at length above. Without label cleaning, the training can be overly sensitive and not robust with mislabeled data.

The fourth row of Table III—with the method named "DA" for dataset aware—shows the result of using dataset-aware ArcFace loss in training. Compared with "Naïve Comb," there is a significant improvement on all three of the validation datasets. This demonstrates that the overlapping identity issue for multi-dataset training can be automatically handled with dataset-aware loss.

The last two rows of Table III show the effectiveness incorporated with the domain adaptation approach using GRLs in training. From the results, it can be seen that there is further improvement over "DA," and clearly "DA+GRL" is much better than single dataset training and "Naïve Comb." As the last experiment, a crossing dropout (CD) operation was implemented in the dataset-aware loss. Specifically, Eq. 2 was replaced with the following modification:

$$1_{k_i = k_j, z < p} = \begin{cases} 1, & \text{if } k_i = k_j, \text{ or } k_i \neq k_j \text{ and } z < p \\ 0, & \text{otherwise} \end{cases} \qquad \text{Eq. 11}$$

where z is a random variable with uniform distribution $z \sim \mathcal{U}(0,1)$ and p is a predefined probability, set as 0.0001 in this experiment. Different from the original dataset-aware loss, this modification only includes a few classes from other datasets for each training sample. Setting p=1 will degrade to the original softmax loss, while setting p=0 is the proposed dataset-aware loss. With a small value for p, the randomly selected classes are not likely to be the overlapping classes in the training data. Said another way, if only a small number of classes are randomly selected, the chance that those classes are involved in the overlapping identity issue is relatively small. Meanwhile, it can also help the model to learn discrimination against different datasets. By setting p to be a small value (e.g., 0,0001), there is improvement for the CFP-FP and AgeDB-30 datasets with roughly comparable results for the LFW dataset.

Overview of Training Platform

Figure 6:
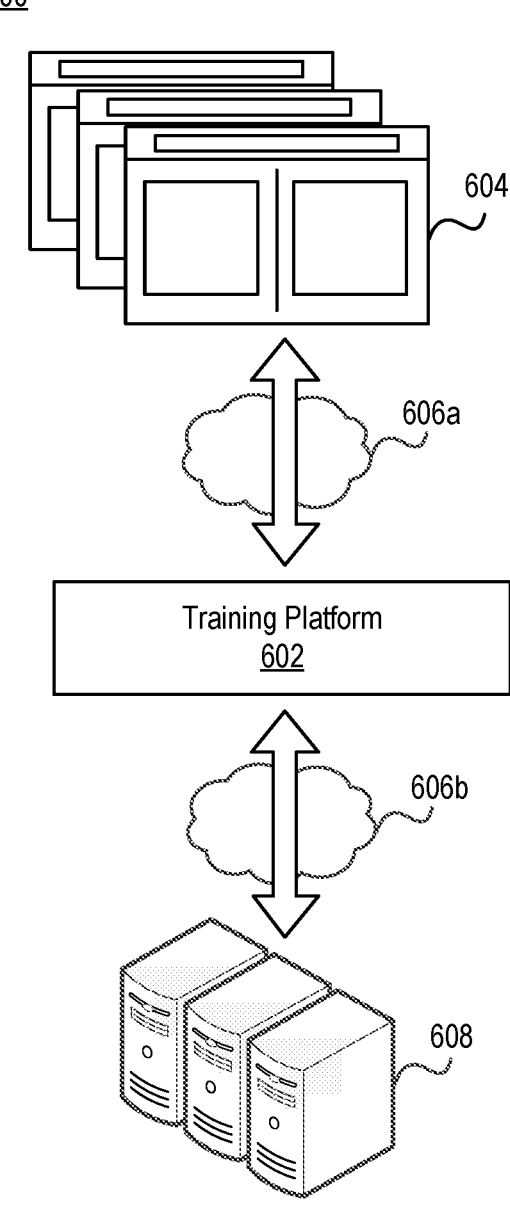
FIG. 6 illustrates a network environment that includes a training platform able to execute instructions for training models to perform facial recognition using the dataset-aware method described herein.

FIG. 6 illustrates a network environment 600 that includes a training platform 602 able to execute instructions for training models to perform facial recognition using the dataset-aware method described herein. The training platform 602 may be comprised of a series of modules that are operable to perform different steps of the dataset-aware method. For example, different modules may be responsible for tuning, managing, and applying the embedding subnetwork (e.g., embedding subnetwork 302 of FIG. 3), classification subnetwork (e.g., classification subnetwork 304 of FIG. 3), and dataset classifier subnetwork (e.g., dataset classifier subnetwork 306 of FIG. 3). The term "module" refers broadly to software components, firmware components, and/or hardware components. Accordingly, aspects of the training platform 602 could be implemented in software, firmware, and/or hardware.

As shown in FIG. 6, individuals can interface with the training platform 602 via interfaces 604. The training platform 602 may be responsible for creating the interfaces through which datasets can be selected, models can be trained, etc. Through the interfaces 604, individuals may also be able to manage the deployment of models, for example, by specifying which models should be deployed on which computing devices.

In some embodiments, the datasets that are to be used for training are managed by the training platform 602. For example, the training platform 602 may locally store copies of databases and then update those databases as necessary.

In other embodiments, the databases that are to be used for training are acquired, retrieved, or otherwise obtained by the training platform 602. For example, an individual may access the training platform 602 and then select, via an interface generated by the training platform 602, the databases that are to be used for training. Then, the training platform 602 may obtain (e.g., via bulk data interfaces or application programming interfaces) copies of the selected databases. Alternatively, the training platform 602 may automatically obtain the databases that are to be used for training based on, for example, which combinations of databases are found to produce the best accuracy through experimentation.

As noted above, the training platform 602 may reside in a network environment 600. Thus, the editing platform 602 may be connected to one or more networks 606*a-b*. The network(s) 606*a-b* can include personal area networks (PANs), local area networks (LANs), wide area networks (WANs), metropolitan area networks (MANs), cellular networks, the Internet, etc. Additionally or alternatively, the training platform 602 can be communicatively connected to computing device(s) over a short-range wireless connectivity technology, such as Bluetooth®, Near Field Communication (NFC), Wi-Fi® Direct (also referred to as "Wi-Fi P2P"), and the like.

The interfaces 604 may be accessible via a web browser, desktop application, mobile application, or over-the-top (OTT) application. Accordingly, the interfaces 604 may be viewed on a personal computer, tablet computer, mobile phone, wearable electronic device (e.g., a watch or fitness accessory), network-connected ("smart") electronic device, (e.g., a television or home assistant device), virtual/augmented reality system (e.g., a head-mounted display), or some other electronic device.

In some embodiments, at least some components of the training platform 602 are hosted locally. That is, part of the training platform 602 may reside on the computing device used to access one of the interfaces 604. For example, the training platform 602 may be embodied as a desktop application executing on a personal computer, or the training platform 602 may be embodied as a mobile application executing on a mobile phone. Note, however, that the desktop and mobile applications may be communicatively connected to one or more network-accessible resources. Examples of network-accessible resources include private storage mediums (e.g., those maintained by enterprises or individuals), private cloud infrastructures, and public cloud infrastructures. The network-accessible resource may host other components of the training platform 602, or the network-accessible resource may host content, such as facial images, that can be used by the training platform 602.

In other embodiments, the training platform 602 is executed entirely by a cloud computing service operated by, for example, Amazon Web Services®, Google Cloud Platform™, or Microsoft Azure®. In such embodiments, the training platform 602 may reside on a network-accessible server system 608 comprised of one or more computer servers. These computer server(s) can include different types of data (e.g., datasets of facial images, models, algorithms for statistically measuring performance), user information (e.g., profiles and credentials), and other assets.

Methodologies for Training a Model in a Dataset-Aware Manner

FIG. 7 includes a flow diagram of a process 700 for training a model to perform facial recognition in a dataset-aware manner. Initially, a computing device can obtain (i) a first dataset that includes a first series of facial images of a first set of individuals and (ii) a second dataset that includes a second series of facial images of a second set of individuals (step 701). As discussed above, the first and second set of individuals may overlap in some situations. Said another way, the second set of individuals may share at least one individual in common with the first set of individuals. Any individuals that are included in the first and second series of facial images will be associated with two different identities, namely, a first identity based on her facial images in the first series and a second identity based on her facial images in the second series. To ensure that these overlapping identities do not negatively impact performance, training of the model can be done in a dataset-aware manner.

For each facial image in the first dataset, the computing device can compute an embedding and then determine loss for the embedding within the first dataset, so as to produce a first series of loss metrics (step 702). Similarly, for each facial image in the second dataset, the computing device can compute an embedding and then determine loss for the embedding within the second dataset, so as to produce a second series of loss metrics (step 703). Each loss metric in the first series of loss metrics may be determined for a corresponding facial image in the first series of facial images, and each loss metric in the second series of loss metrics may be determined for a corresponding facial image in the second series of facial images.

In some embodiments, the model is representative of a neural network that includes (i) an embedding network, (ii) a classification network, and (iii) a dataset classifier network. In such embodiments, the embedding network may be configured to take, as input, a given facial image and a first network parameter and then produce a given embedding as output, and the classification network may be configured to take, as input, the given embedding and a second network parameter and then produce a proposed classification for the given facial image as output. Meanwhile, the dataset classifier network may be configured to take, as input, the given embedding and a third network parameter and then produce a dataset indicator for the given facial image as output. At a high level, the dataset classifier network can classify whether the given facial image provided to the embedding network as input belongs to the first dataset or the second dataset.

As discussed above, to learn the first, second, and/or third network parameters, the computing device can identify the embeddings created during training that minimize loss as much as possible. Some or all of these network parameters could be optimized in a multi-stage process to ensure that embeddings are dataset invariant. For example, in a first stage of the multi-stage process, the second and third network parameters may be initialized and then the classification network and the dataset classifier network can be trained separately. In a second stage of the multi-stage process, the second and third network parameters may be tuned following convergence of the classification network and the dataset classifier network.

Then, the computing device can store the first and second series of loss metrics in a data structure that is associated with a model to be trained to perform facial recognition using the first and second datasets (step 704). The first series of loss metrics may be used to determine a first loss function that can be backpropagated through the model for training purposes. Similarly, the second series of loss metrics may be used to determine a second loss function that can be backpropagated through the model for training purposes. By separately determining loss within each dataset, the computing device can ensure that identities shared between the first and second datasets do not negatively impact performance of the model.

FIG. 8 includes a flow diagram of another process 800 for training a model to perform facial recognition with multiple datasets of facial images. Initially, a computing device can form a training set from multiple datasets of facial images (step 801). These datasets may be privately or publicly available. Examples of publicly available datasets that are available for training are mentioned above. Accordingly, each dataset of the multiple datasets may be obtained from a different source (e.g., a different network-accessible storage medium that is accessible via a bulk data interface or application programming interface). Different datasets could also be obtained from the same source but under different conditions (e.g., different times, such as day/night or summer/winter).

In some embodiments, these datasets are specified by an individual (also referred to as an "administrator") who is responsible for overseeing training. For example, the administrator may select these databases through an interface generated by a training platform that is executing on the computing device. Alternatively, the computing device (and, more specifically, the training platform) may automatically select these databases based on a characteristic of the model or a desired training criterion (e.g., number of datasets to be selected, amount of computational resources available, etc.), or the computing device may simply select all databases on a predetermined list that are presently available.

As mentioned above, the multiple datasets may overlap to varying degrees. For example, some datasets may be entirely exclusive of one another. Thus, a dataset may not share any identities in common with another dataset. However, some datasets may overlap with one another. Assume, for example, that the multiple databases include (i) a first set of facial images that includes a first facial image of a given individual and (ii) a second set of facial images that includes a second facial image of the given individual. Since the given individual is associated with at least one facial image in the first and second sets, the given individual will have overlapping identities from the perspective of the computing device. This is true even if the first and second facial images are different facial images.

To address the issue posed by overlapping identities, the computing device can train the model in a dataset-aware manner. To accomplish this, the computing device can generate a feature vector for each facial image in the training set using the model (step 802). Each feature vector may include (i) an embedding of features of a face that are determined through analysis of a corresponding facial image, (ii) an identity label that specifies an identity of an individual to whom the face belongs, and (iii) an index label that specifies a dataset of which the corresponding facial image is a part. Thereafter, the computing device can determine loss for each feature vector entirely within a corresponding dataset, such that loss is separately determined within each dataset of the multiple datasets (step 803).

The computing device can then propagate the losses to the model, so as to produce a trained model that is able to perform facial recognition (step 804). As discussed above, the model may include (i) an embedding network that produces the embedding as output, (ii) a classification network that produces the identity label as output and determines a first classification loss for the embedding, and (iii) a dataset classifier network that produces the index label as output and determines a second classification loss for the embedding. Accordingly, to propagate the losses to the model, the computing device may backpropagate the first classification loss through the classification network while modifying the classification network to train the classification network. After backpropagating the first classification loss through the classification network, the computing device can further backpropagate the first classification loss through the embedding network while modifying the embedding network to train the embedding network. Moreover, the computing device may backpropagate the second classification loss through the dataset classifier network while modifying the dataset classifier network to train the dataset classifier network. After backpropagating the second classification loss through the dataset classifier network, the computing device can further backpropagate the second classification loss through the embedding network while modifying the embedding network to train the embedding network.

The computing device can then store the trained model in a data structure (step 805). In some embodiments, the data structure is internal to the computing device. For example, the computing device may store the trained model in its own memory. In other embodiments, the data structure is external to the computing device. For example, the computing device may deploy the trained model in another computing device. This other computing device could be, for example, a mobile phone, tablet computer, or wearable electronic device. As another example, this other computing device could be part of an AR system or surveillance system.

Unless contrary to possibility, these steps could be performed in various sequences and combinations. For example, some steps in the processes of FIGS. 7-8 may be performed periodically or repeatedly to ensure that performance of the model remains good. As another example, some steps in the processes of FIGS. 7-8 may be performed whenever a new dataset is to be added to the training data. Accordingly, the model could be retrained whenever a criterion is met (e.g., a new dataset is made available, performance has dropped below a threshold), or the model could be retrained whenever input is received that is indicative of a request, by an administrator, to retrain the model.

Other steps could also be included in some embodiments. As one example, information gleaned through training could be made available to the administrator responsible for overseeing the training. For instance, if the computing device (and, more specifically, the training platform) discovers that a certain combination of datasets leads to good performance, the computing device may surface that insight through an interface that is accessible to the administrator. Additionally or alternatively, the computing device may surface that insight through a notification. Examples of notifications include text messages, email messages, push notifications, and the like. The administrator may also be notified whenever the model is retrained through similar means.

Processing System

Figure 9:
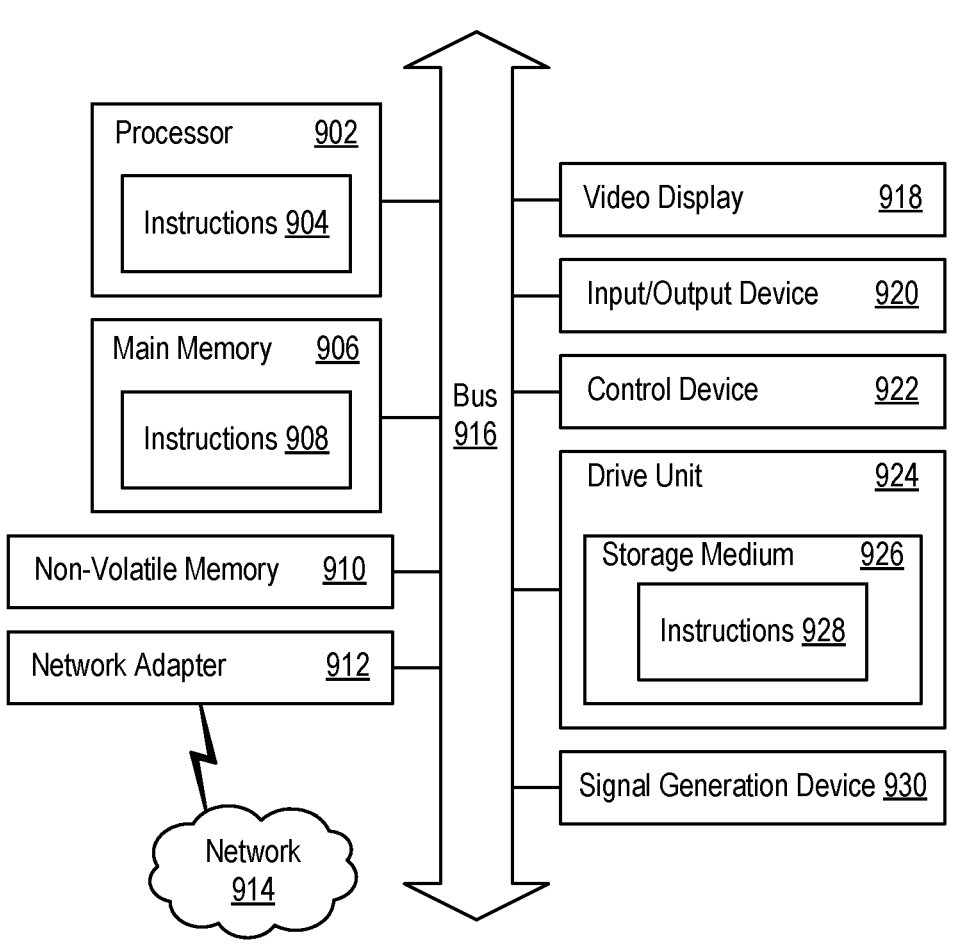
FIG. 9 is a block diagram illustrating an example of a processing system in which at least some processes described herein can be implemented.

FIG. 9 is a block diagram illustrating an example of a processing system 900 in which at least some processes described herein can be implemented. For example, components of the processing system 900 may be hosted on a computing device on which a training platform is executing.

The processing system 900 may include one or more central processing units ("processors") 902, main memory 906, non-volatile memory 910, network adapter 912, video display 918, input/output devices 920, control device 922 (e.g., a keyboard or pointing device), drive unit 924 including a storage medium 926, and signal generation device 930 that are communicatively connected to a bus 916. The bus 916 is illustrated as an abstraction that represents one or more physical buses or point-to-point connections that are connected by appropriate bridges, adapters, or controllers. The bus 916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), Inter-Integrated Circuit (I²C) bus, or an Institute of Electrical and Electronics Engineers (IEEE) standard 1394 bus (also referred to as "Firewire").

The processing system 900 may share a similar processor architecture as that of a desktop computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions—sequential or otherwise—that specify action(s) to be taken by the processing system 900.

While the main memory 906, non-volatile memory 910, and storage medium 926 are shown to be a single medium, the terms "machine-readable medium" and "storage medium" should be taken to include a single medium or multiple media (e.g., a centralized/distributed database and/or associated caches and servers) that store one or more sets of instructions 928. The terms "machine-readable medium" and "storage medium" shall also be taken to include any medium that is capable of storing, encoding, or carrying a set of instructions for execution by the processing system 900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in an electronic device. When read and executed by the processors 902, the instruction(s) cause the processing system 900 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the particular type of machine- or computer-readable media used to effect distribution.

Further examples of machine- and computer-readable media include recordable-type media, such as volatile and non-volatile memory devices 910, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 912 enables the processing system 900 to mediate data in a network 914 with an entity that is external to the processing system 900 through any communication protocol supported by the processing system 900 and the external entity. The network adapter 912 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

The network adapter 912 may include a firewall that governs and/or manages permission to access/proxy data in a network. The firewall may also track varying levels of trust between different machines and/or applications. The firewall can be any number of modules having any combination of hardware, firmware, or software components able to enforce a predetermined set of access rights between a set of machines and applications, machines and machines, or applications and applications (e.g., to regulate the flow of traffic and resource sharing between these entities). The firewall may additionally manage and/or have access to an access control list that details permissions including the access and operation rights of an object by an individual, a machine, or an application, and the circumstances under which the permission rights stand.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A system for training a model to perform facial recognition, the system comprising:

an embedding network that takes, as input, an image of a face to be recognized and a first network parameter and then outputs an embedding;

a classification network that takes, as input, the embedding and a second network parameter and then outputs a first label that is representative of a proposed identity of an individual to whom the face belongs; and a dataset classifier network that takes, as input, the embedding and a third network parameter and then outputs a second label that is representative of a mapping of the first label to a dataset to which the image belongs, wherein at least one of the first network parameter, the second network parameter, or the third network parameter is optimized in a multi-stage process to ensure that embeddings are dataset invariant, wherein, in a first stage of the multi-stage process, the second and third network parameters are initialized and then the classification network and the dataset classifier network are trained separately, and wherein, in a second stage of the multi-stage process, the second and third network parameters are tuned following convergence of the classification network and the dataset classifier network.

2. The system of claim 1, wherein the embedding is a vector representation of facial features that are extracted from the image by the embedding network.

3. The system of claim 1, wherein the first and second network parameters are learned in training through analysis of embeddings, output by the embedding network for facial images that serve as training data, that minimize classification loss.

4. The system of claim 1, wherein the classification network is further configured to determine a dataset-aware classification loss for the embedding, and wherein the dataset classifier network is further configured to determine a classification loss for the embedding.

5. The system of claim 4, further comprising:

a backpropagation algorithm that, when executed, backpropagates the dataset-aware classification loss through the classification network, and backpropagates the classification loss through the dataset classifier network.

6. The system of claim 5, wherein the backpropagation algorithm, when executed, backpropagates, after backpropagating the dataset-aware classification loss through the classification network, the dataset-aware classification loss through the embedding network while modifying the embedding network to train the embedding network; and backpropagates, after backpropagating the classification loss through the dataset classifier network, the classification loss through the embedding network while modifying the embedding network to train the embedding network.

7. The system of claim 1, wherein the embedding network further takes, as input, multiple datasets, and wherein the multiple datasets include (i) a first set of facial images that includes the image and (ii) a second set of facial images that includes a second image of the face of the individual to whom the face belongs.

8. The system of claim 7, wherein the image and the second image are different facial images.

9. The system of claim 7, wherein each dataset from the multiple datasets is obtained from a different source.

10. A method comprising:

receiving an image of a face to be recognized;

providing the image, as input, to an embedding network that produces an embedding of features of the face as output;

providing the embedding, as input, to a classification network that produces, as output, a first label that is representative of a proposed identity of an individual to whom the face belongs and a dataset-aware classification loss for the embedding; and providing the embedding, as input, to a dataset classifier network that produces, as output, a second label that is representative of a mapping of the first label to a dataset to which the image belongs and a classification loss for the embedding;

backpropagating the dataset-aware classification loss through the classification network;

after backpropagating the dataset-aware classification loss through the classification network, backpropagating the dataset-aware classification loss through the embedding network while modifying the embedding network to train the embedding network;

backpropagating the classification loss through the dataset classifier network; and after backpropagating the classification loss through the dataset classifier network, backpropagating the classification loss through the embedding network while modifying the embedding network to train the embedding network.

11. The method of claim 10, wherein the embedding is a vector representation of facial features that are extracted from the image by the embedding network.

12. The method of claim 10, further comprising:

providing a first network parameter, as input, to the embedding network;

providing a second network parameter, as input, to the classification network; and providing a third network parameter, as input, to the dataset classifier network.

13. The method of claim 12, wherein the first and second network parameters are learned in training through analysis of embeddings, output by the embedding network for facial images that serve as training data, that minimize classification loss.

14. The method of claim 12, further comprising:

optimizing at least one of the first network parameter, the second network parameter, or the third network parameter in a multi-stage process to ensure that embeddings are dataset invariant.

15. The method of claim 14, further comprising optimizing at least one of the first network parameter, the second network parameter, or the third network parameter by:

in a first stage of the multi-stage process, initializing the second and third network parameters and then separately training the classification network and the dataset classifier network, and in a second stage of the multi-stage process, tuning the second and third network parameters following convergence of the classification network and the dataset classifier network.

* * * * *